United States Patent
Zeng et al.

(10) Patent No.: US 10,498,400 B1
(45) Date of Patent: Dec. 3, 2019

(54) HIGH SENSITIVITY NFC READER

(71) Applicant: APPLE INC., Cupertino, CA (US)

(72) Inventors: Xinping Zeng, San Jose, CA (US); Peter Agboh, Burlingame, CA (US); Vusthla Sunil Reddy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/140,800

(22) Filed: Sep. 25, 2018

(51) Int. Cl.
| | |
|---|---|
| *H04B 5/00* | (2006.01) |
| *H04W 4/80* | (2018.01) |
| *H04W 52/52* | (2009.01) |
| *H02J 50/70* | (2016.01) |

(52) U.S. Cl.
CPC ............ *H04B 5/0037* (2013.01); *H02J 50/70* (2016.02); *H04W 4/80* (2018.02); *H04W 52/52* (2013.01)

(58) Field of Classification Search
CPC .......... H04B 5/0037; H04B 5/02; H04B 1/40; H04W 52/52; H04W 4/80; H02J 50/70
See application file for complete search history.

(56) References Cited

U.S. PATENT DOCUMENTS

| | | | | |
|---|---|---|---|---|
| 9,780,437 B2* | 10/2017 | Knox | ............ | H01Q 1/2225 |
| 2007/0194886 A1* | 8/2007 | Bang | ............ | G06K 7/0008 |
| | | | | 340/10.1 |
| 2008/0022773 A1* | 1/2008 | McKenna | ............ | G01H 5/00 |
| | | | | 73/597 |
| 2008/0079547 A1* | 4/2008 | Alicot | ............ | G06K 7/0008 |
| | | | | 340/10.3 |
| 2008/0107093 A1* | 5/2008 | Meiyappan | ............ | H04B 1/1036 |
| | | | | 370/339 |
| 2009/0015378 A1* | 1/2009 | Song | ............ | H04Q 9/00 |
| | | | | 340/10.1 |
| 2009/0251362 A1* | 10/2009 | Margomenos | ............ | G01S 7/032 |
| | | | | 342/175 |
| 2017/0358857 A1* | 12/2017 | Watkins | ............ | H01Q 1/525 |

* cited by examiner

*Primary Examiner* — Andrew Wendell
(74) *Attorney, Agent, or Firm* — Fay Kaplun & Marcin, LLP

(57) ABSTRACT

A device and method for mitigating the effects of carrier leakage and improving a near-field communications ("NFC"). The device includes a transmitter configured to generate an output signal including an output carrier signal, a receiver configured to demodulate a received signal including a received carrier signal, and an antenna configured to transmit the output signal and receive the received signal. The device further includes circuitry configured to electrically connect the transmitter via a transmit path to the antenna and the receiver via a receive path to the antenna, wherein the output carrier signal leaks into the receive path as a leakage signal, the circuitry comprising a phase shifter connecting the transmit path to the receive path and configured to phase shift the leakage signal with respect to the received carrier signal to reduce a voltage of a combined leakage signal and received signal received by the receiver.

20 Claims, 4 Drawing Sheets

HIGH SENSITIVITY NFC READER

BACKGROUND INFORMATION

A user equipment ("UE") may be configured with near-field communication ("NEC") technology. NFC is a communications protocol operating at the unlicensed frequency band of 13.56 MHz. Two NFC-enabled devices may communicate securely at short ranges. For example, two NFC-enabled devices may exchange data by tapping the two devices together or bringing them into close proximity, or an NFC-enabled device may be used in a contactless payment system with an NFC-enabled payment terminal.

An NFC-enabled device includes a transmitter for generating an output signal and a receiver for demodulating a received signal. The NFC-enabled device may include a single antenna for transmitting the output signal and receiving the received signal. Thus, the transmission circuitry path from the transmitter to the antenna may comprise common circuitry with the receiving circuitry path from the antenna to the receiver.

The sharing of common transmit and receive circuitry may cause the output signal to leak into the receive chain as a leakage signal. Thus, the leakage signal may combine with the received signal to increase the signal power seen at the receiver input. This typically results in a decreased sensitivity for the receiver.

The range at which NFC-enabled devices may communicate depends on a variety of factors, including transmit power and receiver sensitivity. When a device is transmitting and receiving simultaneously an increase in carrier transmit power may cause an increase in carrier power leakage into the receive chain. This may degrade the receiver sensitivity and limit the communication range. Thus, a need exists for mitigating carrier leakage and improving the range at which NFC-enabled devices may communicate.

SUMMARY

The present application discloses a device, method and integrated circuit for mitigating the effects of carrier leakage and improving a near-field communications ("NFC"). A first exemplary embodiment describes an NFC device including a transmitter, a receiver, an antenna and additional circuitry. The transmitter is configured to generate an output signal including an output carrier signal and the receiver is configured to demodulate a received signal including a received carrier signal. The antenna is configured to transmit the output signal and receive the received signal. The additional circuitry is configured to electrically connect the transmitter via a transmit path to the antenna and the receiver via a receive path to the antenna, wherein the output carrier signal leaks into the receive path as a leakage signal, the circuitry comprising a phase shifter connecting the transmit path to the receive path and configured to phase shift the leakage signal with respect to the received carrier signal to reduce a voltage of a combined leakage signal and received signal received by the receiver.

In a further exemplary embodiment, a method is performed by an NFC transceiver. The method includes generating an output signal at a transmitter, the output signal including an output carrier signal for transmission via a transmit path to an antenna, receiving a received signal including a received carrier signal from the antenna, wherein the received carrier signal is received at a receiver via a receive path from the antenna, wherein the output carrier signal leaks into the receive path as a leakage signal, phase shifting the leakage signal with respect to the received carrier signal to reduce a voltage of a combined leakage signal and received signal received by the receiver and demodulating the received signal.

In a still further exemplary embodiment, NFC circuitry is disclosed. The NFC circuitry includes transmit path circuitry connecting a transmitter to an antenna and receive path circuitry connecting the antenna to a receiver, wherein a connection between the transmit path circuitry and receive path circuitry includes a phase shifter configured to phase shift a leakage signal from the transmit path circuitry with respect to a received signal on the receive path circuitry.

DETAILED DESCRIPTION

Figure 1:
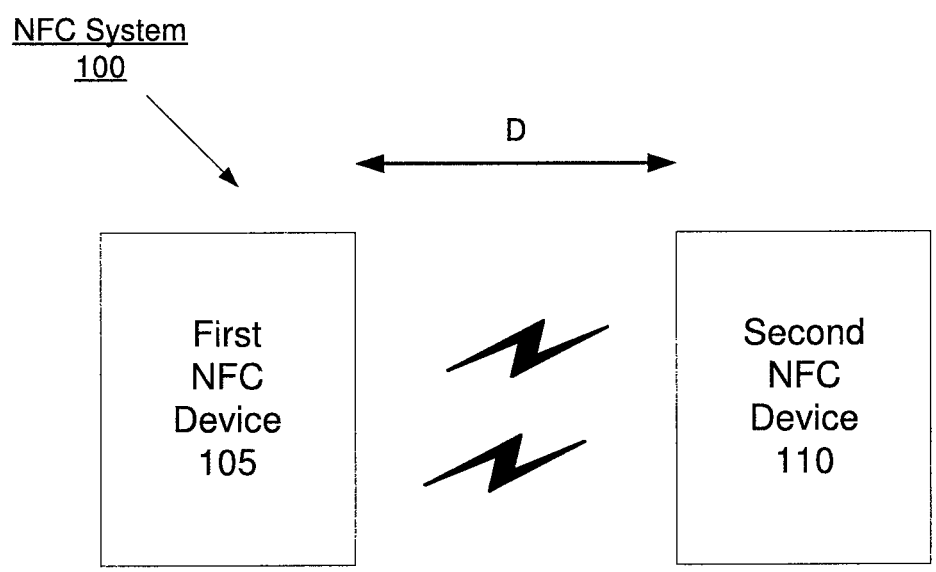
FIG. 1 shows an example NFC system according to various exemplary embodiments described herein.

The exemplary embodiments may be further understood with reference to the following description and the appended drawings, wherein like elements are provided with the same reference numerals. The exemplary embodiments provide an improved NFC reader receive circuitry that improves communication range and receiver sensitivity.

FIG. 1 shows an example NFC system 100 according to various exemplary embodiments described herein. The exemplary system 100 includes a first NFC-enabled device 105 and a second NFC-enabled device 110. Those skilled in the art will understand that the NFC-enabled devices 105-110 may be any type of electronic component that is configured with an NFC transmitter and an NFC receiver, e.g., mobile phones, tablet computers, smartphones, phablets, embedded devices, wearable device, Cat-M devices, Cat-M1 devices, MTC devices, eMTC devices, other types of Internet of Things (IoT) devices, etc.

The first NFC device 105 and the second NFC device 110 are separated by a distance D. The distance D represents the maximum distance at which the devices 105, 110 may both successfully transmit information to and receive information from the other of the two devices 105, 110. As will be described in more detail below with respect to FIG. 2 and FIG. 3, the distance D is limited by the transmit power and receiver sensitivity of each of the two devices 105, 110.

Figure 2:
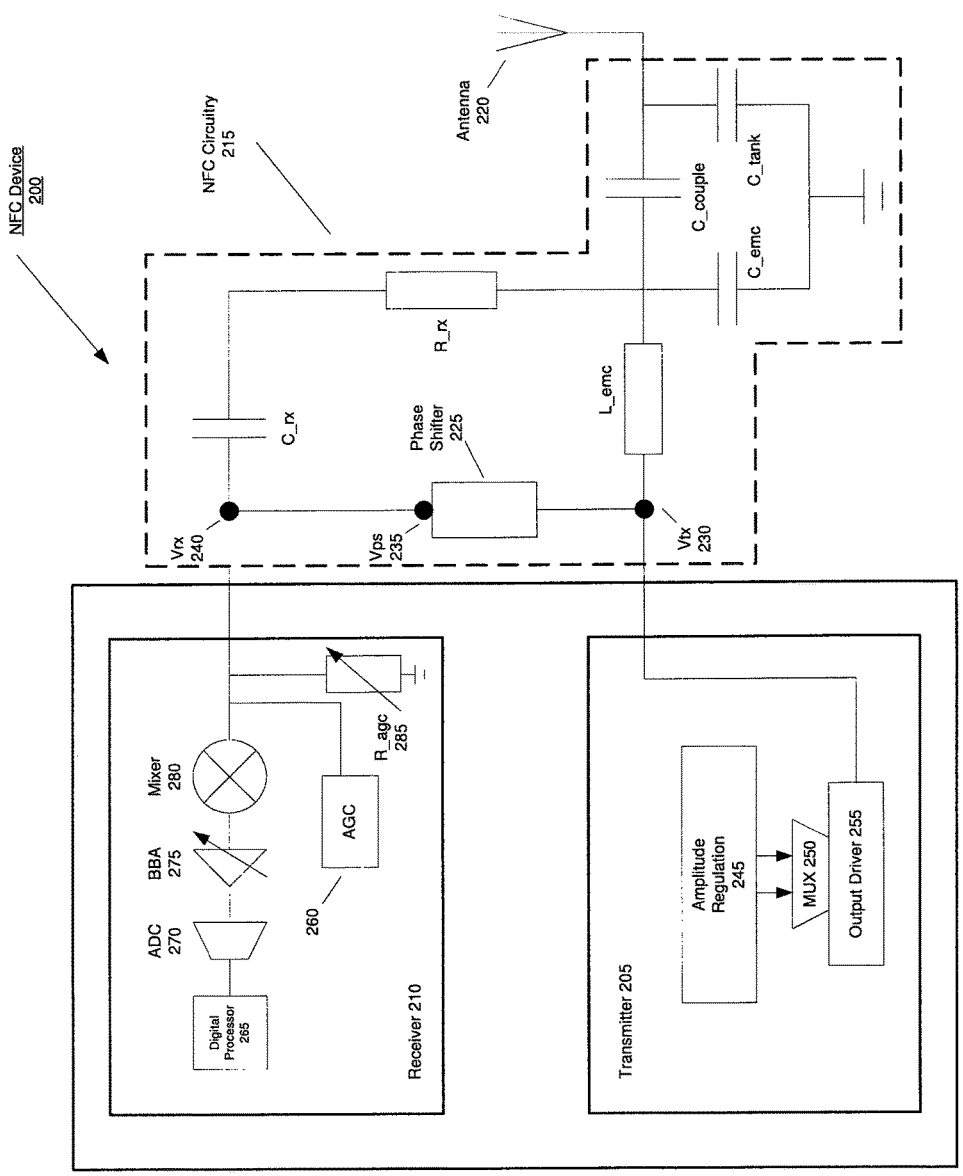
FIG. 2 shows an exemplary circuit for an improved NFC device according to various exemplary embodiments described herein.

FIG. 2 shows an exemplary circuit for an improved NEC device according to various exemplary embodiments described herein. The NFC device 200 may represent any electronic device that is configured with NFC transmit/receive functionality, examples of which are provided above. It should be understood that the below description may apply equally to the first and second NFC-enabled devices 105 and 110.

The NFC device 200 may include a transmitter 205, a receiver 210, NFC circuitry 215 and an antenna 220. The transmitter 205 may include amplitude regulation circuitry 245, a multiplexer 250 and an output driver 255. The transmitter may generate a signal for transmission to another NFC-enabled device. The generated signal may include a carrier signal modulated with a data signal (e.g., a signal that includes the data to be transmitted). The signal may be sent from the transmitter 205 to the antenna 220 via a transmit path in the NFC circuitry 215. The antenna 220 transmits the signal for reception by a second NFC device.

The receiver 210 may include an automatic gain control ("AGC") 260, a digital processor 265, an analog-to-digital converter 270, a baseband amplifier 275 and a mixer 280. Specifically, a variable resistor (or varistor) R_agc 285 may be used to control the input voltage of a received signal. A signal may be received from the second NFC device at the antenna 220. The signal reaches the receiver 210 via a receive path in the NFC circuitry 215.

The NFC circuitry 215 and antenna 220 may be utilized for both the transmission of the output signal and the reception of a received signal. Thus, the transmit path and the receive path may share common circuitry. This sharing of common circuitry may cause leakage of the transmission carrier signal into the receive chain. A transmission carrier leakage signal, when combined with an incoming received carrier signal, may cause an increase in the carrier voltage at the receiver 210.

Automatic gain control ("AGO") circuitry may be implemented in receivers such that an output amplitude may remain constant despite a varying input level. For example, a radio signal at a receiver may weaken due to fading. AGC effectively increases the volume of the weakened input signal such that the output does not change despite the signal fading. In the present embodiments, the AGC Resistor R_agc 285 is implemented in the receiver 210 to normalize the received signal.

Transmission carrier leakage may increase the strength of a received incoming carrier signal. An increase in signal strength may cause the AGC Resistor R_agc 285 to reduce the receiver gain to accommodate the received signal. Reduction in receiver gain may lead to a degradation of the sensitivity of the receiver 210. The range at which an NFC-enabled device 200 may receive and effectively demodulate an incoming carrier signal is limited by the sensitivity of the receiver. Thus, a degradation of receiver sensitivity may cause a corresponding decrease in the distance D at which the device 200 may effectively receive a transmission from a second NFC-enabled device.

Mitigating the deleterious effects of carrier leakage may be accomplished by phase shifting the leakage voltage. For example, a phase shift of the leakage voltage to 180° out of phase with the receiver voltage may reduce the signal strength seen at the receiver 210. In some embodiments, the phase shift can be other than 180° out of phase, such as a phase shift within the range of 170° to 190° out of phase. This may cause the AGC circuitry 260 to increase the receiver gain, thereby increasing the sensitivity of the receiver 210 and the range at which the NFC device 200 may effectively receive and demodulate an incoming received signal, when compared to an NFC device that does not implement the phase shift. In a complementary effect, the receiver sensitivity may remain the same even though the transmit power is increased and leakage signal is also increased.

Thus, the NFC device 200 according to the exemplary embodiments described herein may comprise a phase shifter 225 disposed in the NFC circuitry 215 between the transmit path and the receive path. The phase shifter 225 may be a variable capacitor, a network of passive components, or any other circuitry operable to determine a waveform of the transmission carrier leakage voltage Vtx 230, determine a waveform of an incoming carrier signal voltage Vrx 240, and phase shift the carrier leakage voltage Vtx 230 with respect to the incoming carrier signal voltage Vrx 240. The phase shifted leakage voltage Vps 235 may combine with the incoming carrier signal voltage Vrx 240 to reduce the signal power seen at the receiver 210 compared to a non-phase shifted combination. As described above, this may increase the range at which the NFC device 200 may receive signals from a second NFC-enabled device based on an increased receive sensitivity and/or increase the transmission range of the NFC device 200 based on an increase in transmit power.

Figure 3:
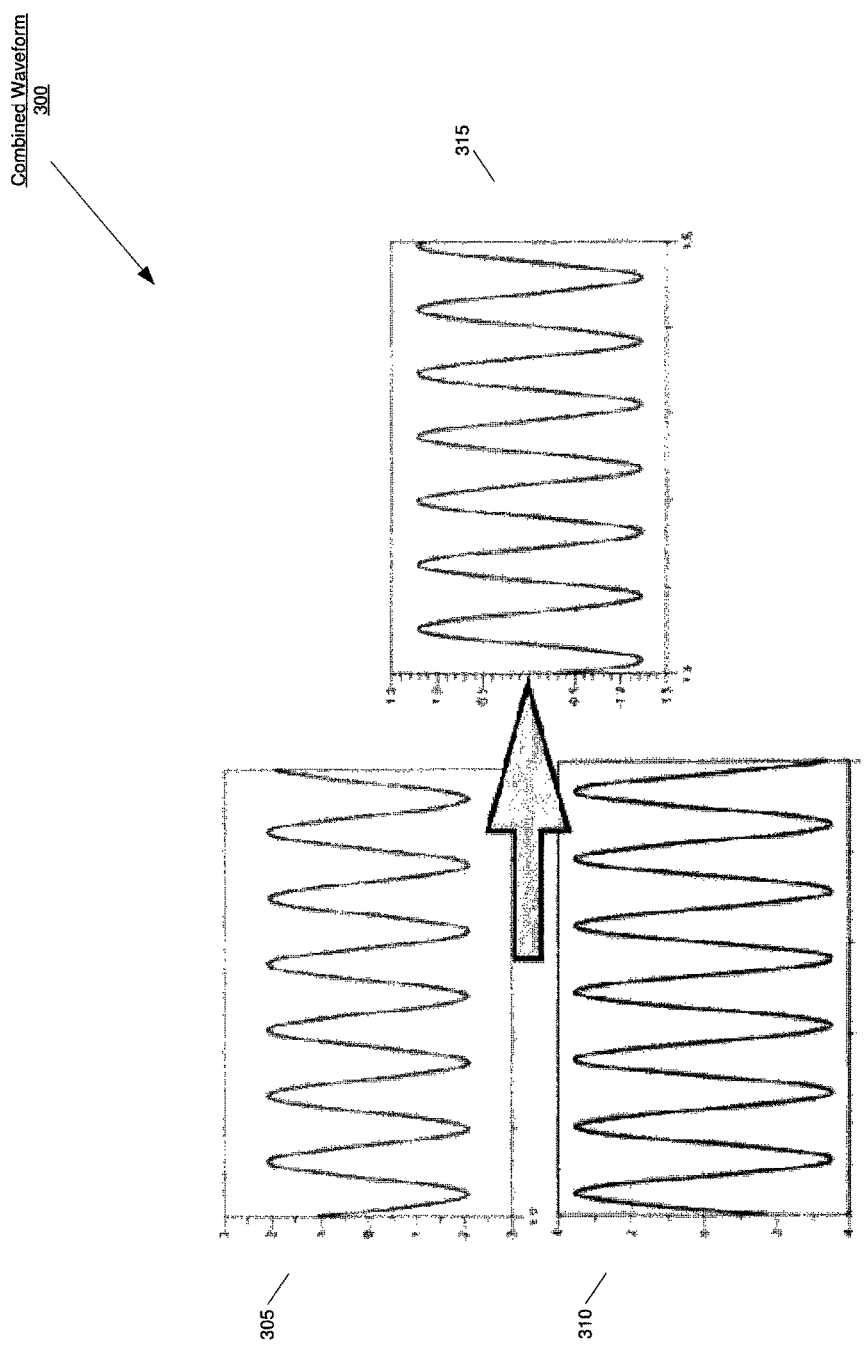
FIG. 3 shows an exemplary receiver input voltage of an NFC device according to various exemplary embodiments described herein.

FIG. 3 shows an exemplary receiver input voltage of an NFC device according to various exemplary embodiments described herein. The first waveform 305 corresponds to the incoming carrier signal received from a second NFC-enabled device, i.e. the received signal (e.g., Vrx 240). The second waveform 310 corresponds to the phase shifted transmission carrier leakage signal (e.g., Vps 235). As described above, the second waveform 310 may be phase shifted to 180° out of phase with the first waveform 305. In some embodiments, the phase shift can be other than 180° out of phase, such as a phase shift within the range of 170° to 190° out of phase. The third waveform 315 corresponds to the combined signals 305 and 310 seen at the receiver 210 of the NFC device 200. The combination of the first and second waveforms 305 and 310 results in a reduction to the signal power seen at the receiver 210, as compared with the signal power that would be seen at the receiver 210 without phase shifting the leakage signal 310.

The exemplary embodiments described herein may be used to increase the range at which two NFC-enabled devices may communicate. The range increase may be considered from at least two perspectives, to be described below.

Referring to the NFC system described with respect to FIG. 1, communication between the two NFC-enabled devices 105 and 110 is limited by the transmit power and the receiver sensitivity of each of the two devices 105, 110. For example, the first NFC device 105 may transmit at a first transmit power P1 and have a first receiver sensitivity S1 and the second NFC device 110 may transmit at a second transmit power P2 and have a second receiver sensitivity S2. The ability of the first NFC device 105 to successfully receive and demodulate a signal from the second NFC device 110 is limited by its receiver sensitivity S1 and the transmit power P2 of the second NFC device 110. In other words, the first NFC device 105 may successfully receive and process a transmission from the second NFC device 110 if the second NFC device 110 transmits at a sufficiently high transmit power P2 and the first NFC device 105 has a sufficiently high receiver sensitivity S1. The same principle applies to the ability of the second NFC device 110 to successfully receive and process a transmission from the first NFC device 105. The second NFC device 110 may process a transmission successfully if the first NFC device 105 transmits at a sufficiently high transmit power P1 and the second NFC device 110 has a sufficiently high receiver sensitivity S2.

In a first exemplary scenario, the first NFC device 105 may have low receiver sensitivity S1 compared with the second NFC device 110. The first NFC device 105 may have a transmission power P1 sufficient for the second NFC device 110 to successfully process a transmission from the first device, but may not have a receiver sensitivity S1 sufficient to process transmissions from the second NFC device 110. Thus, the range D at which the two devices may communicate is limited by the receiver sensitivity S1. The exemplary embodiments described herein may increase the receiver sensitivity S1 such that the receiver sensitivity S1 is no longer the factor limiting the range D. For example, because using the phase shifter 225 results in a lower received voltage, the variable resistor R_agc 285 may be increased to result in a higher sensitivity S1 for the receiver 210 without having to decrease the transmit power of the first NFC device 105.

In a second exemplary scenario, the second NFC device 110 may have low receiver sensitivity S2 compared with the first NFC device 105. The first NFC device 105 may endeavor to increase the transmission power P1 such that the second NFC device 110 may process transmissions received by the first NFC device 105. However, an increase in transmission power P1 may correspondingly increase the signal leakage of the first NFC device 105, degrading the receiver sensitivity S1 and thereby limiting the range at which the first NFC device 105 may receive transmissions. The exemplary embodiments described herein may allow for an increase in transmission power P1 while maintaining the receiver sensitivity S1, such that the first NFC device 105 may receive transmissions from the second NFC device 110 despite an increase in transmission power P1 and signal leakage.

Figure 4:
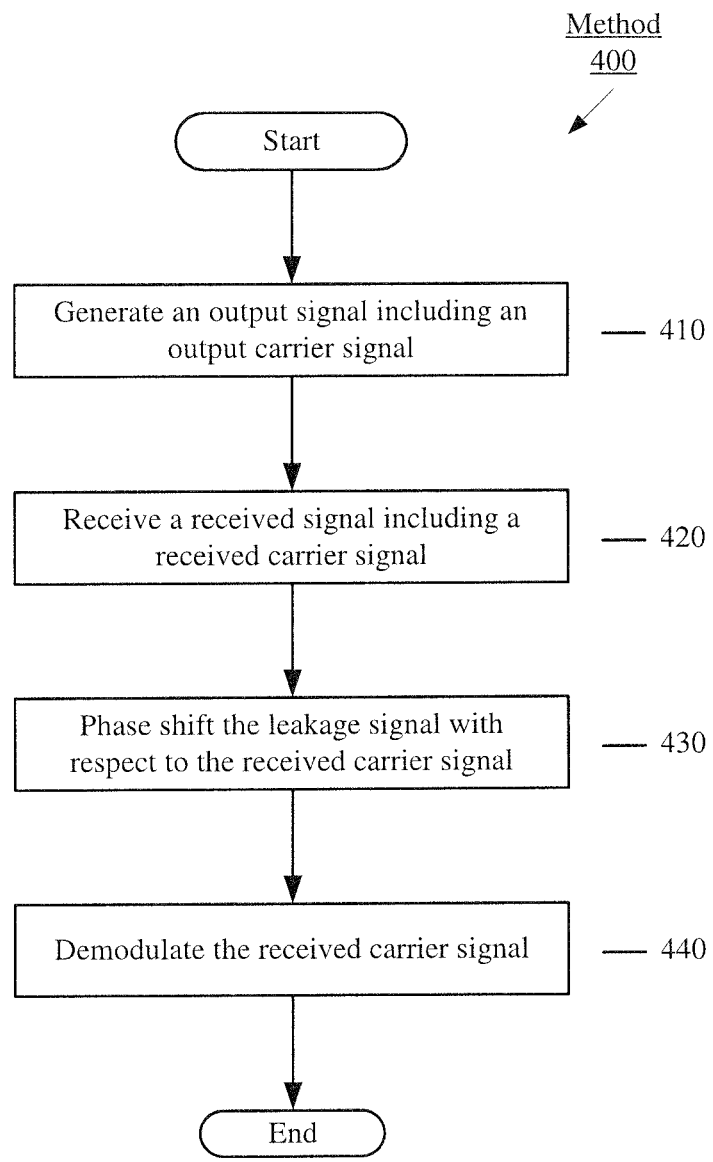
FIG. 4 shows an exemplary method for increasing a maximum communication range and increasing receiver sensitivity according to various exemplary embodiments described herein.

FIG. 4 shows an exemplary method for increasing a maximum communication range and increasing receiver sensitivity according to various exemplary embodiments described herein. The method 400 will be described with reference to the NFC device 200 of FIG. 2. However, the method 400 is applicable to any device enabled with NFC transmission circuitry and NFC receive circuitry that shares a common circuitry for a transmit path to a shared antenna and a receive path from a shared antenna.

In 410, the device generates an output signal including an output carrier signal. As discussed above, a leakage signal is caused by the output signal leaking into the receive path via the common NFC circuitry 215. The leakage signal has a voltage waveform 230 at the output of the transmitter 205.

In 420, the device receives a received signal including a received carrier signal. As discussed above, the NFC device 200 receives the received signal from a second NFC device at the antenna 220. After being processed by the NFC circuitry 215, the received signal has a voltage waveform 240 at the input to the receiver 210.

In 430, the device phase shifts the leakage signal with respect to the received carrier signal. The leakage signal may be phase shifted to 180° out of phase with the received carrier signal. In some embodiments, the phase shift can be other than 180° out of phase, such as a phase shift within the range of 170° to 190° out of phase. The phase shifted leakage signal may combine with the received carrier signal at the input to the receiver 210. The combined signal may have a reduced voltage when compared with a combined signal that does not have a phase shifted leakage signal.

The received voltage 240 and the phase shifted leakage voltage 235 combine to form a signal voltage seen at the receiver 210. The combined waveform is shown, for example, as waveform 315 of FIG. 3. The combined waveform has a reduced amplitude compared with the waveform that would result in the absence of the phase shift. Thus, as described above, the AGC circuitry 260 in the receiver 210 may increase the gain of the received signal, thereby increasing the sensitivity of the receiver 210 and the range D at which the device may receive transmissions from the second NFC device.

In 440, the receiver 210 demodulates the received carrier signal.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A near-field communication (NFC) device, comprising:
   a transmitter configured to generate an output signal including an output carrier signal;
   a receiver configured to demodulate a received signal including a received carrier signal, the receiver comprising automatic gain control circuitry configured to increase a sensitivity of the receiver based on a voltage of a combined leakage signal and received signal;
   an antenna configured to transmit the output signal and receive the received signal; and
   circuitry configured to electrically connect the transmitter via a transmit path to the antenna and the receiver via a receive path to the antenna, wherein the output carrier signal leaks into the receive path as a leakage signal, the circuitry comprising a phase shifter connecting the transmit path to the receive path and configured to phase shift the leakage signal with respect to the received carrier signal to reduce the voltage of the combined leakage signal and received signal received by the receiver.

2. The NFC device of claim 1, wherein the leakage signal is phase shifted to substantially 180° out of phase with the received signal.

3. The NFC device of claim 1, wherein the leakage signal is phase shifted to between 170° and 190° out of phase with the received signal.

4. The NFC device of claim 1, wherein the phase shifter is disposed between an output of the transmitter and an input of the receiver.

5. The NFC device of claim 1, wherein the transmit path and the receive path share common circuitry.

6. The NFC device of claim 1, wherein the transmitter comprises amplitude regulation circuitry to increase a transmit power of the transmitter.

7. The NFC device of claim 1, wherein the transmitter is configured to increase a power of the output signal based on the voltage of the combined leakage signal and received signal received by the receiver.

8. A method, comprising:
   at a near-field communication (NFC) transceiver:
      generating an output signal at a transmitter, the output signal including an output carrier signal for transmission via a transmit path to an antenna;
      receiving a received signal including a received carrier signal from the antenna, wherein the received carrier signal is received at a receiver via a receive path from the antenna, wherein the output carrier signal leaks into the receive path as a leakage signal,
      phase shifting the leakage signal with respect to the received carrier signal to reduce a voltage of a combined leakage signal and received signal received by the receiver;
      demodulating the received signal; and
      adjusting an automatic gain control of the receiver based on the voltage of the combined leakage signal and received signal.

9. The method of claim 8, wherein the leakage signal is phase shifted to substantially 180° out of phase with the received signal.

10. The method of claim 8, wherein the transmit path and the receive path share common circuitry.

11. The method of claim 8, further comprising:
increasing a transmit power of the transmitter.

12. The method of claim 8, wherein the phase shifting is performed by a phase shifter disposed between the transmit path and the receive path.

13. The method of claim 8, further comprising:
increasing a power of the output signal based on the voltage of the combined leakage signal and received signal.

14. Near-field communication (NFC) circuitry, comprising:
transmit path circuitry connecting a transmitter to an antenna; and
receive path circuitry connecting the antenna to a receiver, wherein a connection between the transmit path circuitry and receive path circuitry includes a phase shifter configured to phase shift a leakage signal from the transmit path circuitry with respect to a received signal on the receive path circuitry, wherein the phase shift of the leakage signal reduces a first voltage of a combined leakage signal and the received signal as compared to a second voltage of a combined leakage signal that is not phase shifted and the received signal.

15. The NFC circuitry of claim 14, wherein the leakage signal is phase shifted to substantially 180° out of phase with the received signal.

16. The NFC circuitry of claim 14, wherein the leakage signal is phase shifted to between 170° and 190° out of phase with the received signal.

17. The NFC circuitry of claim 14, wherein the transmit path circuitry and the receive path circuitry share common circuitry.

18. The NFC circuitry of claim 14, further comprising:
transmitter circuitry configured to generate an output signal, wherein the leakage signal comprises the output signal.

19. The NFC circuitry of claim 14, further comprising:
receiver circuitry configured to demodulate the received signal.

20. The NFC circuitry of claim 14, wherein the antenna is shared between the transmit path circuitry and the receive path circuitry.

* * * * *